United States Patent
Murakami

(10) Patent No.: US 8,139,244 B2
(45) Date of Patent: Mar. 20, 2012

(54) PRINT DATA PROCESSING APPARATUS AND PRINTER

(75) Inventor: Masahiro Murakami, Hekinan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1538 days.

(21) Appl. No.: 11/386,943

(22) Filed: Mar. 23, 2006

(65) Prior Publication Data
US 2006/0215184 A1 Sep. 28, 2006

(30) Foreign Application Priority Data

Mar. 23, 2005 (JP) ................ 2005-083736

(51) Int. Cl.
G06F 3/12 (2006.01)
G06K 15/00 (2006.01)
G06K 1/00 (2006.01)
(52) U.S. Cl. ....... 358/1.15; 358/1.16; 358/1.9; 358/1.13
(58) Field of Classification Search .......... None
See application file for complete search history.

(56) References Cited

U.S. PATENT DOCUMENTS

| | | | |
|---|---|---|---|
| 5,327,526 A | 7/1994 | Nomura et al. | |
| 5,923,013 A | 7/1999 | Suzuki et al. | |
| 6,373,585 B1* | 4/2002 | Mastie et al. | 358/1.15 |
| 2003/0117636 A1* | 6/2003 | Nishikawa | 358/1.9 |
| 2005/0190405 A1 | 9/2005 | Tomita | |
| 2006/0050307 A1* | 3/2006 | Koike | 358/1.15 |

FOREIGN PATENT DOCUMENTS

| | | |
|---|---|---|
| JP | 4 227537 | 8/1992 |
| JP | 6 187112 | 7/1994 |
| JP | H09-065092 A | 3/1997 |
| JP | 10 27076 | 1/1998 |
| JP | 2000 132434 | 5/2000 |
| JP | 2001-282470 A | 10/2001 |
| JP | 2001-358882 A | 12/2001 |
| JP | 2002-041426 A | 2/2002 |
| JP | 2002 366320 | 12/2002 |
| JP | 2004-358672 A | 12/2004 |
| JP | 2005-071187 A | 3/2005 |

OTHER PUBLICATIONS

Japan Patent Office; Notification of Reason for Refusal in Japanese Patent Application No. 2006-083736 (counterpart to the above-captioned U.S. patent application) mailed Sep. 8, 2009.
Japan Patent Office, Notification of Reason for Refusal for Japanese Patent Application No. 2005-083736 (counterpart to the above-captioned U.S. patent application), mailed Sep. 8, 2009.

* cited by examiner

Primary Examiner — Thomas Lett
(74) Attorney, Agent, or Firm — Baker Botts L.L.P.

(57) ABSTRACT

A print data processing apparatus that controls data transmitted to and received from a printer, includes an extension attaching unit that selectively attaches a first extension corresponding to a kind of a formed application or a second extension corresponding to the control process to data outputted to the printer, and a transmission performing unit that transmits data to which the extension is attached to the printer. When the printer is controlled to perform a preset control process, the extension attaching unit attaches a second extension corresponding to the control process to the data.

20 Claims, 13 Drawing Sheets

FIG. 3

| SECOND EXTENSION ATTACHED TO CONTROL PROCESS REQUEST DATA | CONTROL PROCESS |
|---|---|
| 001 | TRANSMISSION OF STATUS OF PRINTER |
| 002 | SETTING OF PRINT FORMAT |
| 003 | SETTIING OF MEDIUM USED FOR PRINT PROCESS |
| 004 | TRANSMISSION OF CORRESPONDING TABLE |
| 005 | OVERWRITING OF CORRESPONDING TABLE |

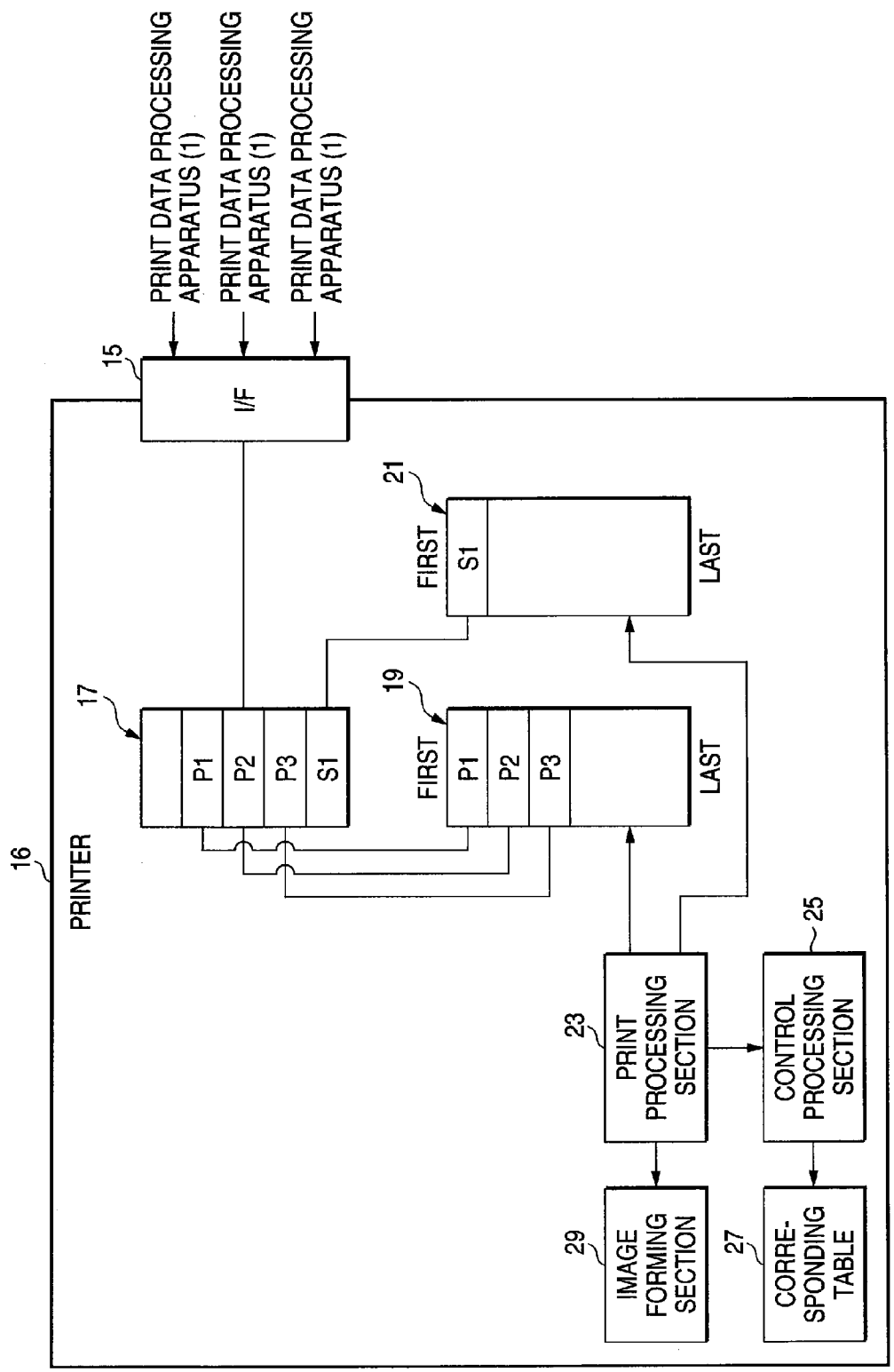

FIG. 10

| EXTENSION OF PRINT DATA | PRIORITY |
|---|---|
| doc | PREFERENCE |
| xls | ORDINARY |
| pdf | ORDINARY |
| ppc | ORDINARY |

PRINT DATA PROCESSING APPARATUS AND PRINTER

CROSS REFERENCE TO RELATED APPLICATION

This application claims priority from Japanese Patent Application No. 2005-083736, filed Mar. 23, 2005, the contents of which are hereby incorporated by reference into the present application.

TECHNICAL FIELD

The present invention relates to a print data processing apparatus and a printer, and more particularly to a print data processing apparatus in which one printer can be shared by a plurality of print data processing apparatus and a printer.

BACKGROUND

When one printer is shared by a plurality of terminal devices, a method for using data processing apparatus is proposed so that an order for outputting data can be quickened or delayed in accordance with a request of a user (Refer, e.g. JP-A-6-187112). That is, when the user transmits data on file data, a name of a file and a priority to the data processing apparatus from the terminal device, the data processing apparatus transmits to the printer a print queue changed depending on the priority from a port different from a port for print data. Then, the printer performs a printing operation in accordance with the queue received from the data processing apparatus.

However, in the above-described technique, since the data on the priority is transmitted to the printer, there is a problem that the port different from the port for the print data needs to be provided. Further, since the data on the priority needs to be transmitted separately from the print data, a communication traffic to the printer is increased.

The present invention is proposed by considering the above-described problems and it is an object of the present invention to provide a print data processing apparatus and a printer in which a port for data on a control process does not need to be separately provided between the print data processing apparatus and the printer and a communication traffic can be reduced between the print data processing apparatus and the printer.

SUMMARY

According to an illustrative example, a print data processing apparatus that controls data transmitted to and received from a printer includes an extension attaching unit that selectively attaches a first extension corresponding to a kind of a formed application or a second extension corresponding to the control process to data outputted to the printer, and a transmission performing unit that transmits data to which the extension is attached to the printer. When the printer is controlled to perform a preset control process, the extension attaching unit attaches a second extension corresponding to the control process to the data.

According to an illustrative example, a printer includes a receiving unit that receives data transmitted from a print controlling apparatus, and a control processing unit that reads an extension of data having the extension of the received data, and performs a control process corresponding to a kind of a second extension when the read extension is the preset second extension which is different from a first extension corresponding to a kind of a formed application.

BRIEF DESCRIPTION OF THE DRAWINGS

FIG. 3 is a table showing the corresponding relation between a second extension and a control process;
FIG. 5 is a block diagram showing the structure of a printer;
FIG. 10 is a table showing the corresponding relation between an extension and the priority in a print process.

DETAILED DESCRIPTION OF ILLUSTRATIVE EXAMPLES

Figure 1:
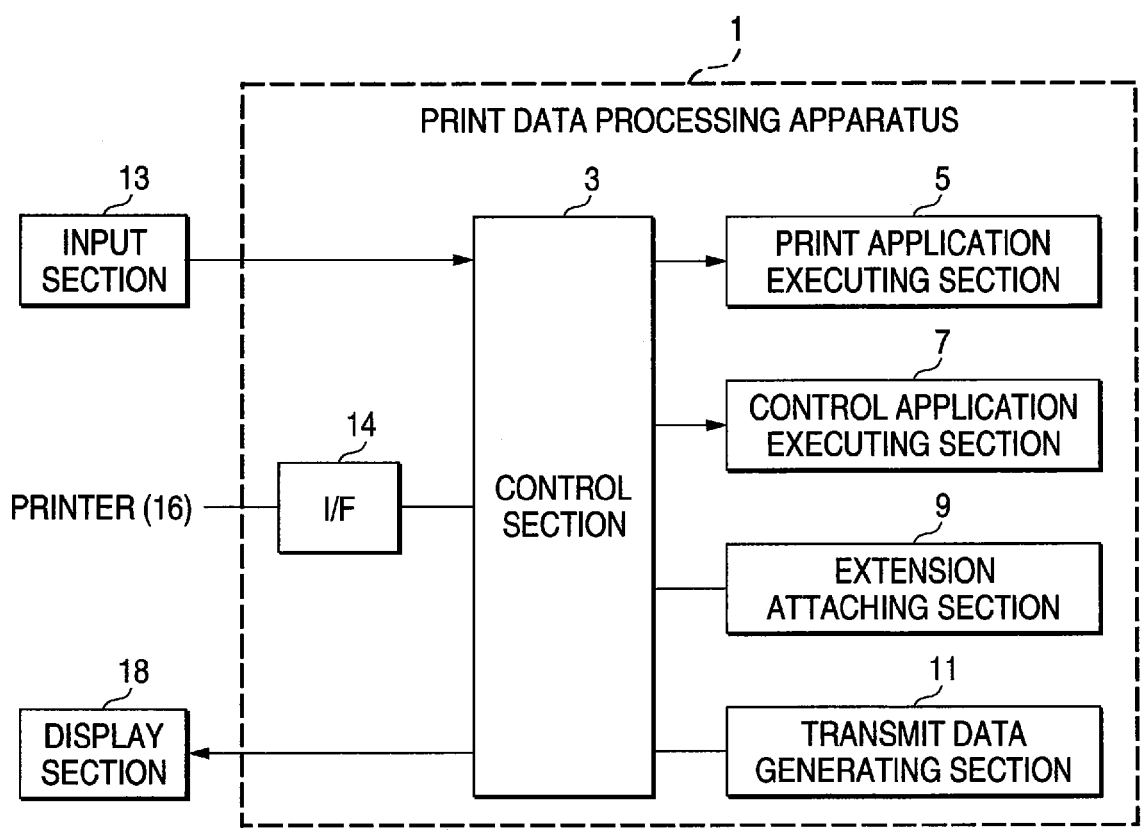
FIG. 1 is a block diagram showing the structure of a print data processing apparatus.

According to an example structure, in the print data processing apparatus, when the printer is controlled to perform the preset control process, the second extension corresponding to the control process performed by the printer is attached to the data transmitted to the printer in place of the first extension corresponding to the kind of the formed application, and the printer that receives the data is controlled to perform the control process corresponding to the second extension.

According to an example structure, for instance, the second extension is attached to the data to be transmitted by using a port for print data and the printer can be controlled to perform the control process corresponding to the second extension. That is, the printer can be controlled to perform a prescribed control process by the data transmitted from the port for the print data. Consequently, a port for the data on the control process does not need to be separately provided between the print data processing apparatus and the printer.

Further, when the printer is controlled to perform the control process by using the extension of the print data, the data for the control process does not need to be transmitted. Thus, a communication traffic between the print data processing apparatus and the printer can be reduced.

According to an illustrative example, the print data processing apparatus further includes a setting unit that sets the preset control process, and a deciding unit that decides whether or not the control process is set by the setting unit. When the deciding unit decides that the control process is set, the extension attaching unit attaches the second extension corresponding to the control process set by the setting unit to the data.

According to an example structure, in the print data processing apparatus, when the deciding unit decides that the control process is set by the setting unit, the extension attaching unit attaches the second extension corresponding to the control process set by the setting unit to the data. As a result, the second extension can be assuredly added to the data.

According to an illustrative example, in the print data processing apparatus, the control process performed by the printer includes any of a transmission of a status of the printer, a setting of a print format, a setting of a medium used for a printing operation, and a setting of a priority of the printing operation.

According to an example structure, the print data processing apparatus can control the printer to perform any of the transmission of a status of the printer, the setting of a print format, the setting of a medium used for the printing operation and the setting of the priority of the printing operation.

According to an illustrative example, in the print data processing apparatus, the data to which the extension is attached includes print data and control process request data that requests for the control process of the printer.

According to an example structure, since the data to which the extension is attached includes the print data and the control process request data, for instance, only the extension of the control process request data can be used for the control process of the printer. Thus, the printer may read the extension only for the control process request data, a throughput of the printer can be reduced.

According to an example structure, when the printer reads the extension of the data including the extension that is received from the print controlling apparatus and the extension is the preset second extension different from the first extension corresponding to the kind of the formed application, the printer performs the control process corresponding to the second extension.

According to an example structure, the printer can read the extension of the data received by using, for instance, a port for print data and perform the control process corresponding to the extension. That is, the printer can perform a prescribed control process in accordance with the data received by the port for the print data. Consequently, a port for the data on the control process does not need to be separately provided between the print controlling apparatus and the printer.

Further, when the control process of the printer is carried out by using the extension of the print data, the data for the control process does not need to be transmitted. Thus, a communication traffic outputted from the print controlling apparatus to the printer can be reduced.

According to an illustrative example, in the printer, the control processing unit includes an extension deciding unit that decides whether or not the extension of the data is the preset second extension, and a control process executing unit that performs the control process corresponding to the second extension when the extension deciding unit decides that the extension is the second extension.

According to an example structure, in the printer, when the extension deciding unit decides that the extension of the data is the second extension, the control process executing unit performs the control process corresponding to the second extension.

Thus, the printer can assuredly perform the control process corresponding to the second extension.

According to an illustrative example, in the printer, the control process corresponding to the second extension includes any of a transmission of a status of the printer, a setting of a print format, a setting of a medium used for a printing operation, and a setting of a priority of the printing operation.

According to an example structure, the printer can perform any of the transmission of the status of the printer, the setting of a print format, the setting of a medium used for the printing operation and the setting of the priority of the printing operation.

According to an illustrative example, the printer further includes an extension storing unit that takes out and stores a part including the extension from the received data having the extension. The extension deciding unit reads the extension from the extension storing unit and makes decision.

According to an example structure, when a control process deciding unit reads the extension, the control process deciding unit may search only a part including the extension that is stored in the extension storing unit. Therefore, a time required for the control process deciding unit to read the extension can be shortened more than that when an entire part of the data is searched.

According to an illustrative example, in the printer, the data having the extension includes print data having the first extension and control process request data having the second extension that requests for the control process of the printer, and the extension storing unit includes an extension storing unit A that stores the first extension of the print data and an extension storing unit B that stores the second extension of the control process request data.

According to an example structure, in the printer, the first extension of the print data can be stored in the extension storing unit A and the second extension of the control process request data can be stored in the extension storing unit B.

Therefore, for instance, when only the second extension of the control process request data is employed for the control process of the printer, if the control process deciding unit reads the extension, the control process deciding unit may search only the extension storing unit B. In such a way, a time required for the control process deciding unit to read the extension can be shortened more than that when the control process deciding unit searches the extensions for all data.

According to an illustrative example, in the printer, the control process executing unit includes a corresponding table of the second extension and the control process to be performed, and determines the control process to be performed in accordance with the corresponding table.

According to an example structure, since the printer is provided with the corresponding table, the printer can easily determine the control process corresponding to the second extension.

According to an illustrative example, in the printer, the control process corresponding to the second extension includes a process that transmits the corresponding table to the print controlling apparatus.

According to an example structure, when the printer receives the data to which a specific second extension is attached, the printer transmits the corresponding table to the print data processing apparatus. The print data processing apparatus can, for instance, edit the corresponding table or return the corresponding table to the printer. In such a way, the corresponding table can be updated, and the combinations of the second element and the control processes can be increased or changed.

According to an illustrative example, in the printer, the control process corresponding to the second extension includes a process that overwrites the corresponding table received from the print controlling apparatus on an existing corresponding table.

According to an example structure, when the printer receives the data to which the specific second extension is attached, the printer overwrites the corresponding table received from the print controlling apparatus on the existing corresponding table. Thus, the corresponding table of the printer can be updated and the combinations of the second extension and the control processes can be increased or changed.

Examples of a print data processing apparatus and a printer will be described below.

FIRST EXAMPLE a) Initially, the structure of the print data processing apparatus 1 will be described with reference to FIG. 1. FIG. 1 is a block diagram showing the structure of the print data processing apparatus 1.

The print data processing apparatus 1 includes a control section 3, a print application executing section 5, a control application executing section 7, an extension attaching section 9, a transmit data generating section 11 and an interface (I/F) 14 and these members are connected to an input section 13, a display section 18 and a printer 16.

The control section 3 controls the entire part of the print data processing apparatus 1. Further, the control section 3 also serves as a deciding unit for deciding whether or not the control application executing section 7 performs a control application to set a control process.

The print application executing section 5 executes a print application to form print data.

The control application executing section 7 functions as a setting unit. That is, the control application executing section 7 sets a preset control process performed by the printer 16 according to a prescribed operation of a user to form control process request data corresponding to the control process.

The extension attaching unit 9 attaches an extension to data (print data and control process request data) transmitted to the printer 16. Specifically, when the control application executing section 7 sets the control process, the extension attaching section 9 attaches a second extension corresponding to the control process to the data. When the control process is not set, the extension attaching section 9 attaches a first extension corresponding to the kind of a formed application to the data.

The transmit data generating section 11 generates the data to which the extension is attached as data transmitted to the printer 16.

The input section 13 includes input devices such as a keyboard, a mouse, etc. and inputs various signals to the control section 3 by the operation of the user.

The interface 14 transmits the data generated by the transmit data generating section 11 to the printer 16.

Figure 2:
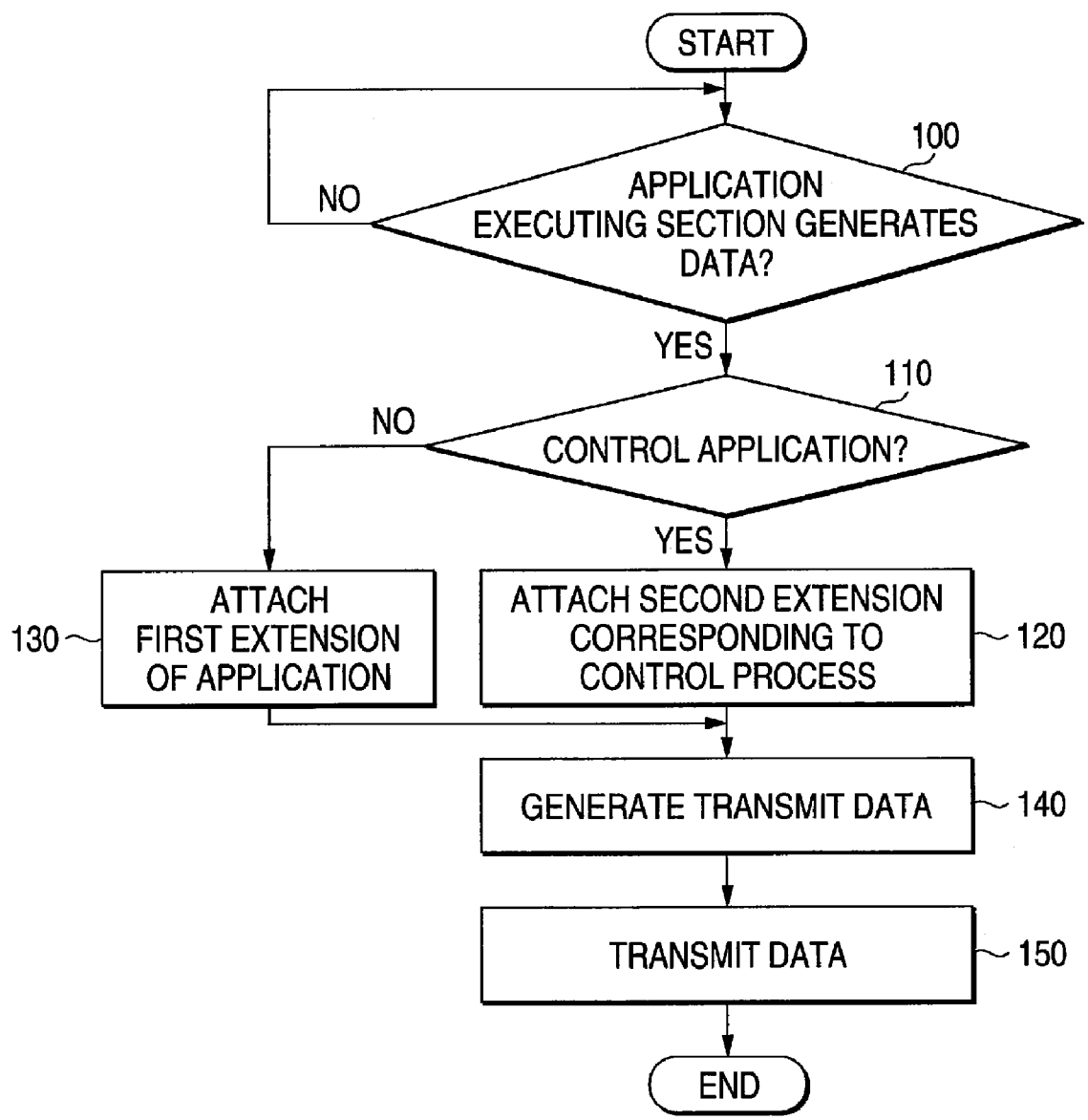
FIG. 2 is a flowchart showing processes performed by the print data processing apparatus.

The display section 18 includes a CRT or the like to display an executing screen of the application.

b) Processes performed by the control section 3 of the print data processing apparatus 1 will be described by using a flowchart shown in FIG. 2 and explanatory views shown in FIGS. 3 and 4.

Firstly, when the user inputs an instruction for performing a printing operation or requesting for the status of the printer from the input section 13, the control section 3 decides whether or not the control application executing section 7 or the print application executing section 5 generates data (step 100 in FIG. 1). In the case of YES, the control section advances to step 110. In the case of NO, the control section remains in the step 100.

Then, in the step 110, the control section decides whether or not the data generated in the step 100 is control process request data generated by the control application executing section 7. That is, the control section decides whether or not the control process is set by the control application executing section 7 as the setting unit. In the case of YES, the control section advances to step 120. In the case of NO, the control section advances to step 130.

In the step 120, the control section controls the extension attaching section 9 to attach the second extension corresponding to the control process to the control process request data.

Figure 4A:
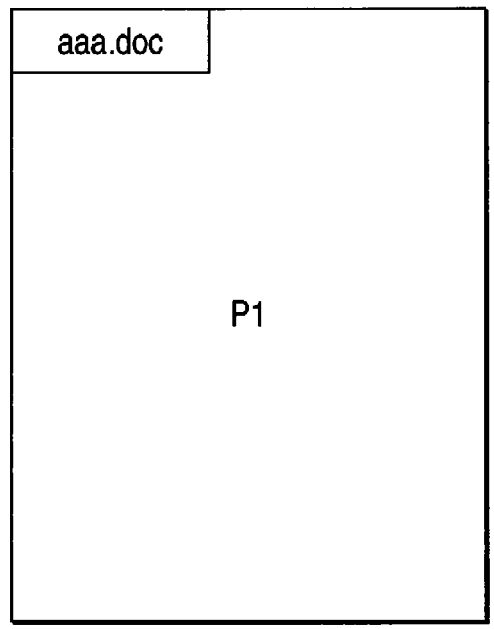
FIGS. 4A and 4B are explanatory views showing the structures of print data and control process request data.
Figure 4B:
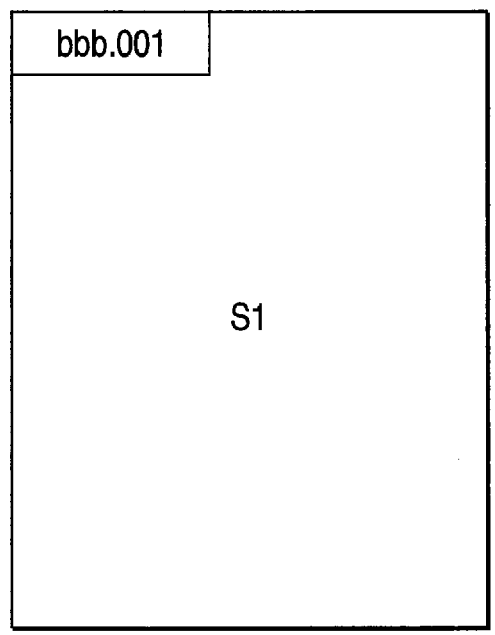

Specifically, the control section controls the extension attaching unit 9 to attach the second extension corresponding to the control process performed by the printer 16 to the control process request data in accordance with a tale shown in FIG. 3. FIG. 4B shows an example that a second extension 001 corresponding to a transmission of the status of the printer as the control process is attached to control process request data S1.

On the other hand, in the step 130, the control section controls the extension attaching section 9 to attach the first extension (for instance, doc, xls, pdf, ppc) for the print data to the data (print data). FIG. 4A shows an example that a first extension 001 is attached to print data P1.

In step 140, the control section controls the transmit data generating section 11 to generate the control process request data to which the second extension is added in the step 120 or the print data to which the first extension is added in the step 130 as transmit data transmitted to the printer.

In step 150, the control section controls the interface 14 to transmit the transmit data generated in the step 140 to the printer 16.

c) The structure of the printer 16 connected to the print data processing apparatus 1 will be described by referring to FIG. 5. FIG. 5 is a block diagram showing the structure of the printer 16.

The printer 16 includes an interface 15, a buffer 17, a print data table (an extension storing unit A) 19, a control process request data table (an extension storing unit B) 21, a print processing section (a control processing unit, an extension deciding unit) 23, a control processing section (a control processing unit, a control process executing unit) 25, a corresponding table 27 stored in a rewritable memory and an image generating section 29.

The interface 15 receives the print data and the control process request data from the print data processing apparatus 1 through a print port. A plurality of print data processing apparatus 1 are connected to the interface 15. The port through which the print data processing apparatus 1 are respectively connected to the interface 15 is merely composed of a single port. Further, the interface 15 sends the print data and the control process request data to the buffer 17, records the address of the print data in the print data table 19 and records the address of the control process request data in the control process request data table 21.

The buffer 17 stores the print data and the control process request data.

The print data table 19 stores a part (address) including the extension of the print data.

The control process request data table 21 stores a part including the extension of the control process request data.

The print processing section 23 searches the control process request data table 21 and reads the extension in an address when the control process request data has address to decide whether or not the extension is the second extension. When the extension is the second extension, the control processing section 25 is activated. Further, the print processing section 23 searches the print data table 19. When there is an address of the print data, the print data corresponding to the address is read from the buffer 17 and outputted to the image generating section 29.

When the control processing section 25 is activated by the print processing section 23, the control processing section specifies the control process corresponding to the extension included in the address detected in the control process request data table 21 by using the corresponding table 27 to perform the control process.

The corresponding table 27 is a table stored in the rewritable memory and specifies a corresponding relation between the second extension attached to the control process request data and the control process, as shown in FIG. 3.

Figure 6:
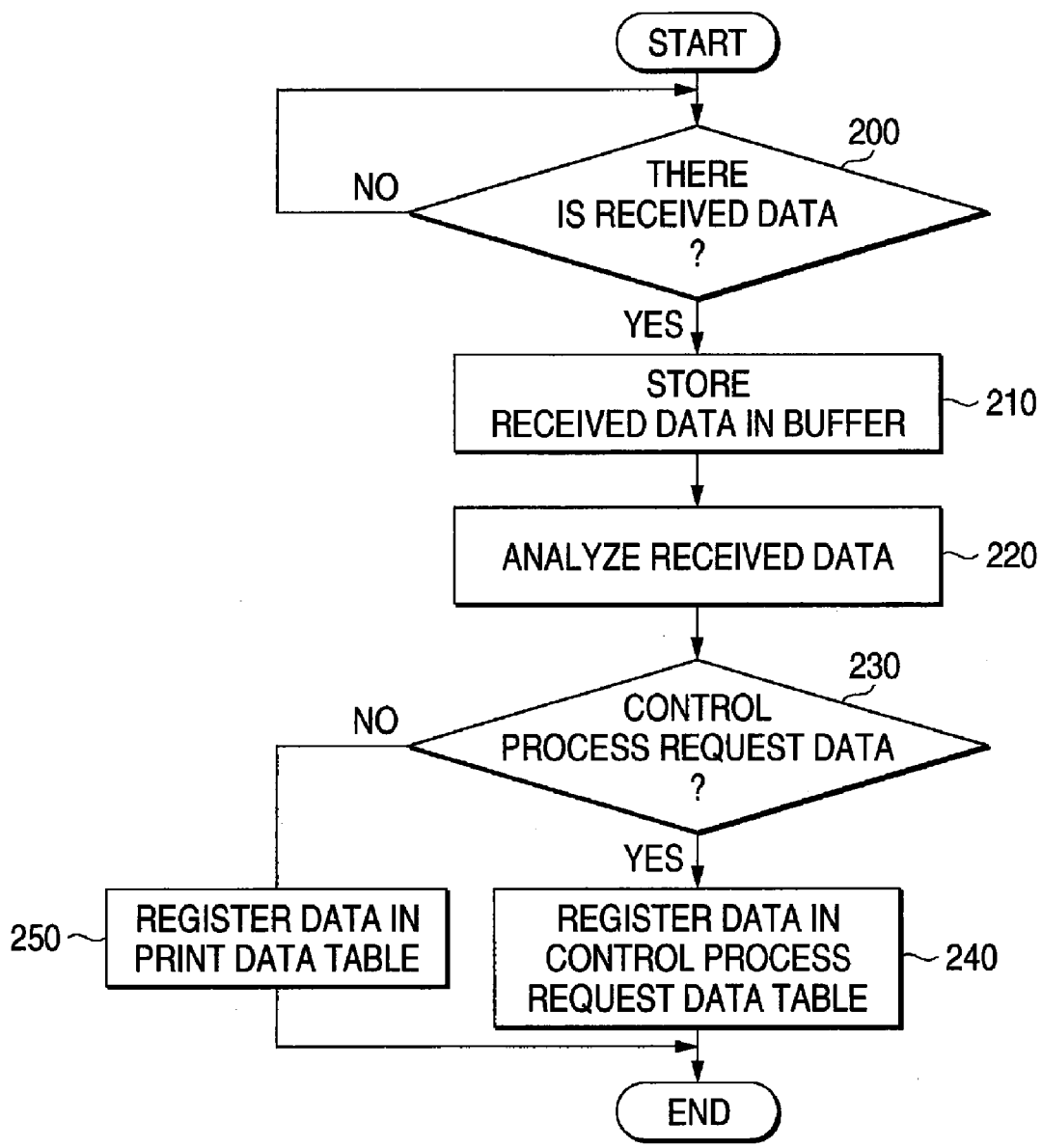
FIG. 6 is a flowchart showing processes performed by the printer.

The image generating section 29 forms an image in accordance with the print data transmitted from the print processing section 23.

d) Processes performed when the interface 15 of the printer 16 receives the data from the print data processing apparatus 1 will be described by referring to a flowchart shown in FIG. 6.

Firstly, the interface 15 waits until the interface receives the data (print data and/or control process request data) from the print data processing apparatus 1 (step 200:NO). When the interface receives the data (step 200: YES), the interface advances to step 210.

In the step 210, the interface stores the received data in the buffer 17.

In step 220, the interface analyzes the received data.

In step 230, the interface decides whether or not the received data is the control process request data. In the case of YES, the interface advances to step 240. In the case of NO (that is, when the received data is the print data), the interface advances to step 250.

In the step 240, the interface registers the part (address) including the extension of the control process request data in the control process request data table 21 and returns to a main routine (not shown in the drawing).

In the step 250, the interface registers the part (address) including the extension of the print data in the print data table 19. At this time, when the address is already registered in the print data table 19, a new address is registered in the last. For instance, when the interface 15 receives the print data P1, P2 and P3 in order, the addresses of the data P1, P2 and P3 are registered in order from the top in the print data table 19 as shown in FIG. 5. When the interface completely registers the addresses, the interface returns to the main routine (not shown in the drawing).

e) Processes performed by the print processing section 23 and the control processing section 25 of the printer 16 will be described below by referring to flowcharts shown in FIGS. 7 and 8.

Figure 7:
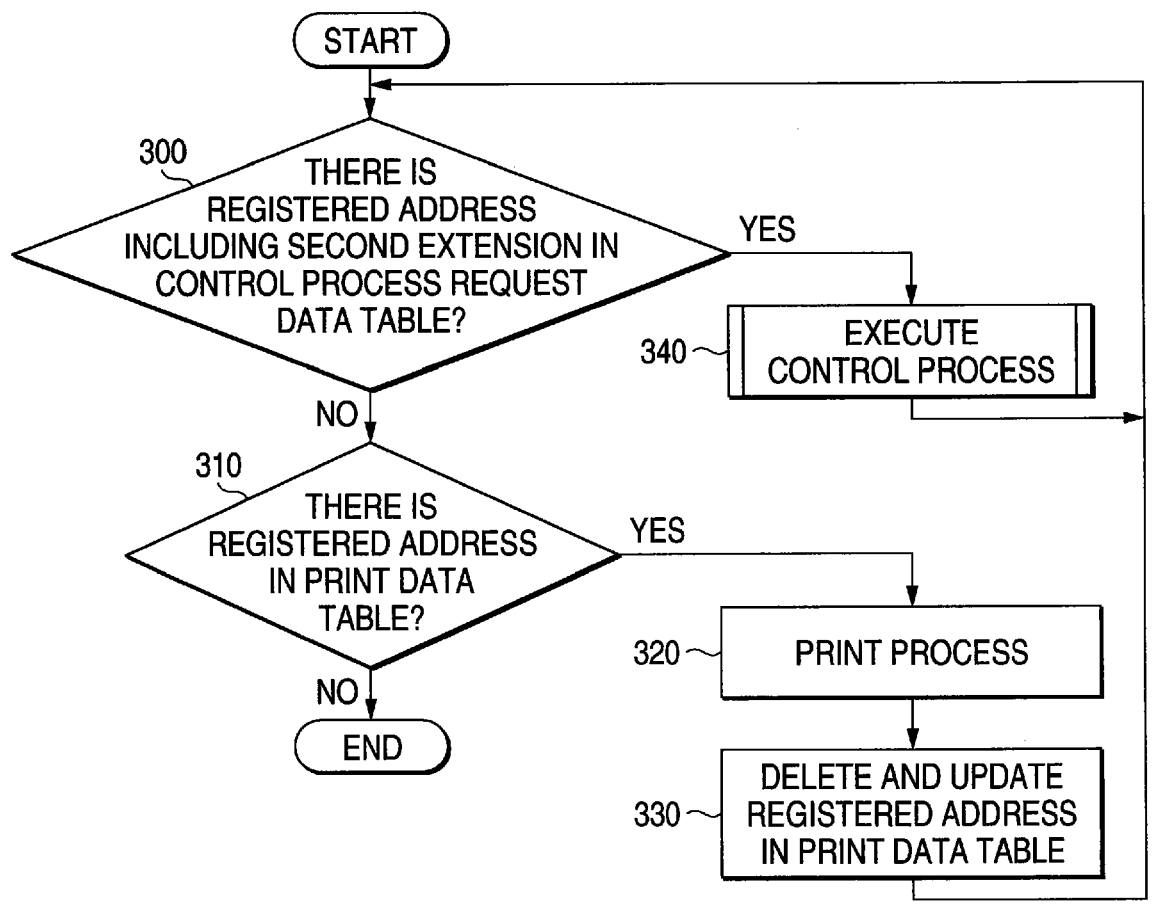
FIG. 7 is a flowchart showing processes performed by the printer.
Figure 8:
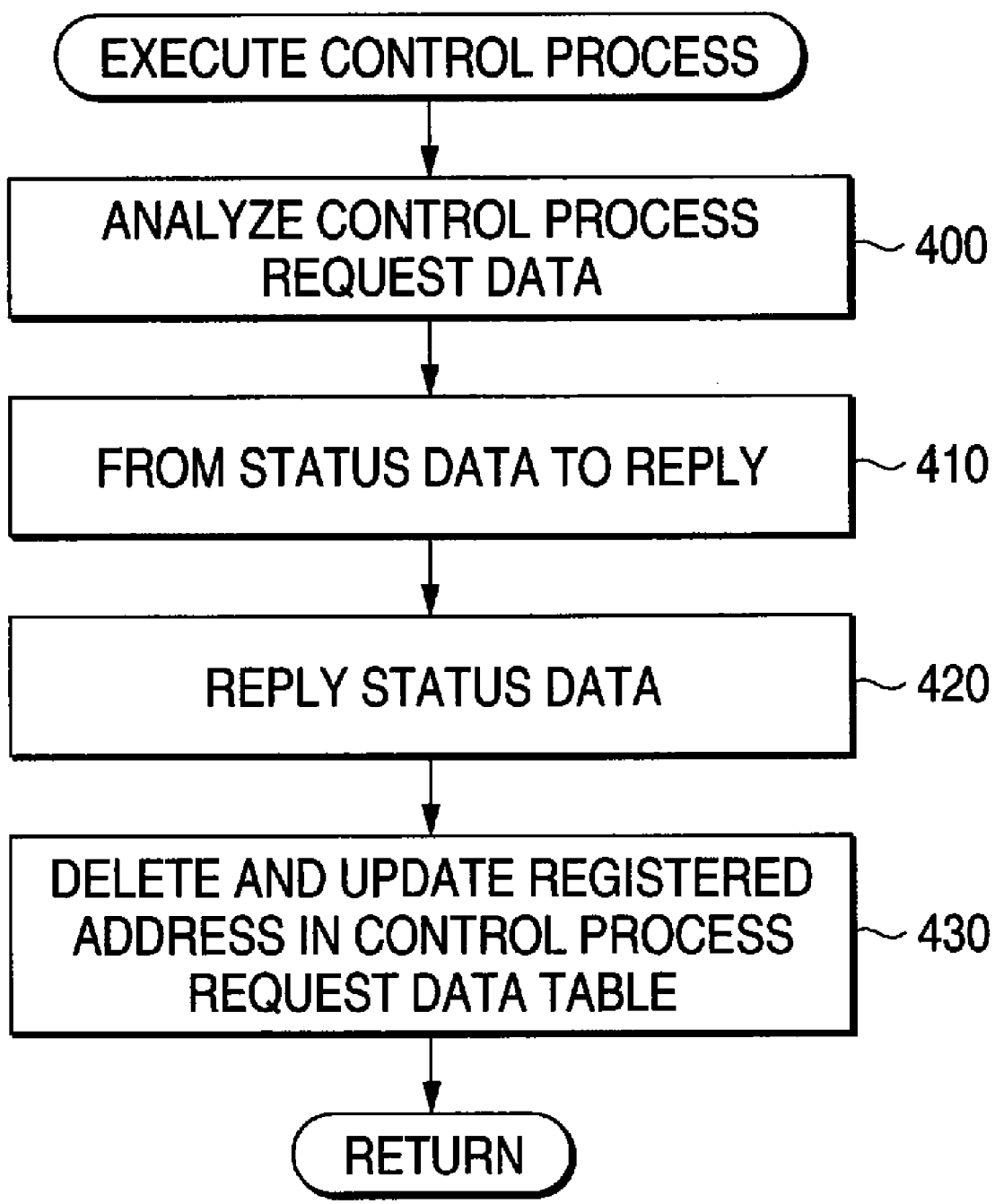
FIG. 8 is a flowchart showing processes performed by the printer.

In step 300 shown in FIG. 7, the print processing section 23 searches the control process request data table 21 to decide whether or not there is an address having the second extension. In the case of NO, the print processing section 23 advances to step 310. In the case of YES, the print processing section 23 advances to step 340.

In the step 310, the print processing section 23 decides whether or not there is an address registered in the print data table 19. In the case of YES, the print processing section 23 advances to step 320. In the case of NO, the print processing section 23 temporarily finishes the processes.

In the step 320, the print processing section 23 reads the print data corresponding to the address detected in the step 310 from the buffer 17 and outputs the print data to the image generating section 29 to perform a print process.

At this time, when a plurality of print data is registered in the print data table 19, the print data having the address registered in the top of the print data table 19 is read out. For instance, as shown in FIG. 5, when the addresses of P1, P2 and P3 are registered in order in the print data table 19, the print data corresponding to P1 as the first address is read from the buffer 17 and the image generating section 29 is controlled to print the print data.

In step 330, the print processing section 23 deletes the address of the print data whose print process is completed from the print data table 19. Further, the print processing section deletes the print data corresponding to the address from the buffer 17. For instance, the print process of the print data P1 is finished, the print processing section deletes the address from the print data table 19 and deletes the print data P1 from the buffer 17. Then, the print processing section returns to the step 300.

On the other hand, in the step 300, when the print processing section decides YES, the print processing section advances to the step 340. Then, the print processing section 23 activates the control processing section 25 to perform the control process. The control process performed by the activated control processing section 25 will be described by referring to a flowchart shown in FIG. 8. In processes shown in FIG. 8, a transmission of status data is performed as the control process.

In step 400, the control processing section 25 analyzes the second extension included in the address of the control process request data that is detected in the step 300 in FIG. 7. Then, the control processing section 25 specifies the control process corresponding to the second extension by using the corresponding table 27 that stores contents shown in FIG. 3.

Here, a case in which the second extension included in the address indicates 001 and the control process corresponding thereto is a transmission of the status of the printer 16 is described as an example.

In step 410, the status data to be transmitted to the print data processing apparatus 1 is formed.

In step 420, the status data is transmitted to the print data processing apparatus 1.

In step 430, the control processing section deletes the address corresponding to the control processes performed in the steps 410 and 420 from the control process request data table 21. Further, the control processing section deletes the control process request data corresponding to the address from the buffer 17. For instance, when the control process of control process request data S1 is finished, the control processing section deletes the address thereof from the print data table 19 and deletes the control process request data Si from the buffer 17. Then, the control processing section returns to the step 300 of the flowchart shown in FIG. 7.

When the second extension detected in the step 400 is an extension other than 001, the control processing section 25 performs other control processes in the steps 410 and 420 in accordance with the detected second extension. For instance, when the detected second extension is 002 as in the corresponding relation (the corresponding table 27) shown in FIG. 3, the control processing section performs the control process for setting the format (for instance, data is printed on a sheet of A4 size) of the print process carried out by the printer 16. When the detected second extension is 003, the control processing section performs the control process for setting of a medium to be printed by the printer 16 (for instance, an instruction of a tray for feeding sheets of a plurality of sheet feed trays provided in the printer 16). When the detected second extension is 004, the control processing section performs the control process for outputting the contents of the corresponding table 27 to the print data processing apparatus 1. When the detected second extension is 005, the control processing section performs the control process for overwriting the data of the corresponding table 27 transmitted from the print data processing apparatus 1 on an existing corresponding table 27. The data of a new corresponding table 27 to be overwritten can be included in, for instance, the control process request data to which the extension 005 is attached.

f) Effects realized by the print data processing apparatus 1 and the printer 16 according to the first example will be described below.

(i) In the print data processing apparatus 1 of the first example, the second extension can be attached to the control process request data to be transmitted to the printer 16 by using the port for the print data and the printer 16 can be controlled to perform the control process corresponding to the second extension. That is, the printer 16 can be controlled to perform the prescribed control process by the control process request data transmitted from the port for the print data. Accordingly, the port for the data on the control process does not need to be separately provided.

(ii) In the print data processing apparatus 1 of the first example, the second extension corresponding to the control process is attached only to the control process request data. Accordingly, the printer 16 may read the extension only for the control process request data on the control process, so that the throughput of the printer 16 can be reduced.

(iii) The printer 16 of the first example can read the second extension of the control process request data received by using the port for the print data and perform the control process corresponding to the second extension. That is, the printer can perform the prescribed control process on the basis of the control process request data received by the port for the print data. Accordingly, the port for the data on the control process does not need to be separately provided between the print data processing apparatus 1 and the printer 16.

(iv) The printer 16 of the first example is provided with the control process request data table 21 for taking out the address including the extension from the control process request data and storing the address. Therefore, when the print processing section 23 reads the extension, the print processing section may search only the address stored in the control process request data table 21. As a result, a time required for the print processing section 23 to read the extension can be shortened more than that when the print processing section 23 searches an entire part of the data recorded in the buffer 17.

(v) The printer 16 of the first example stores the extension of the print data in the print data table 19 and stores the extension of the control process request data in the control process request data table 21. Since the extension on the control process of the printer 16 is merely composed of the extension of the control process request data, when the print processing section 23 reads the second extension related to the control process, the print processing section 23 may search only the control process request data table 21. Thus, a time for the print processing section 23 to read the extension can be shortened more than that when the print processing section 23 searches the extension for all the data.

(vi) The printer 16 of the first example is provided with the corresponding table 27 between the second extension and the control process to be performed. Thus, the printer can easily determine the control process corresponding to the second extension.

(vii) When the printer 16 of the first example receives the control process request data to which the second extension of 004 is attached, the printer transmits the corresponding table 27 to the print data processing apparatus 1. The print data processing apparatus 1 can edit the corresponding table 27 and return the corresponding table to the printer 16. In such a way, the corresponding table 27 of the printer 16 can be updated, and the combinations of the second extension and the control process can be increased or changed.

(viii) When the printer 16 of the first example receives the control process request data to which the second extension of 005 is attached, the printer overwrites the corresponding table 27 received from the print data processing apparatus 1 on the existing corresponding table 27. Thus, the corresponding table 27 of the printer 16 can be updated, and the combinations of the second extension and the control process can be increased or changed.

SECOND EXAMPLE

The basic structures and processes of a print data processing apparatus 1 and a printer 16 of a second example are the same as those of the first example, however, they are partly different therefrom. The different points are mainly described below.

Figure 9:
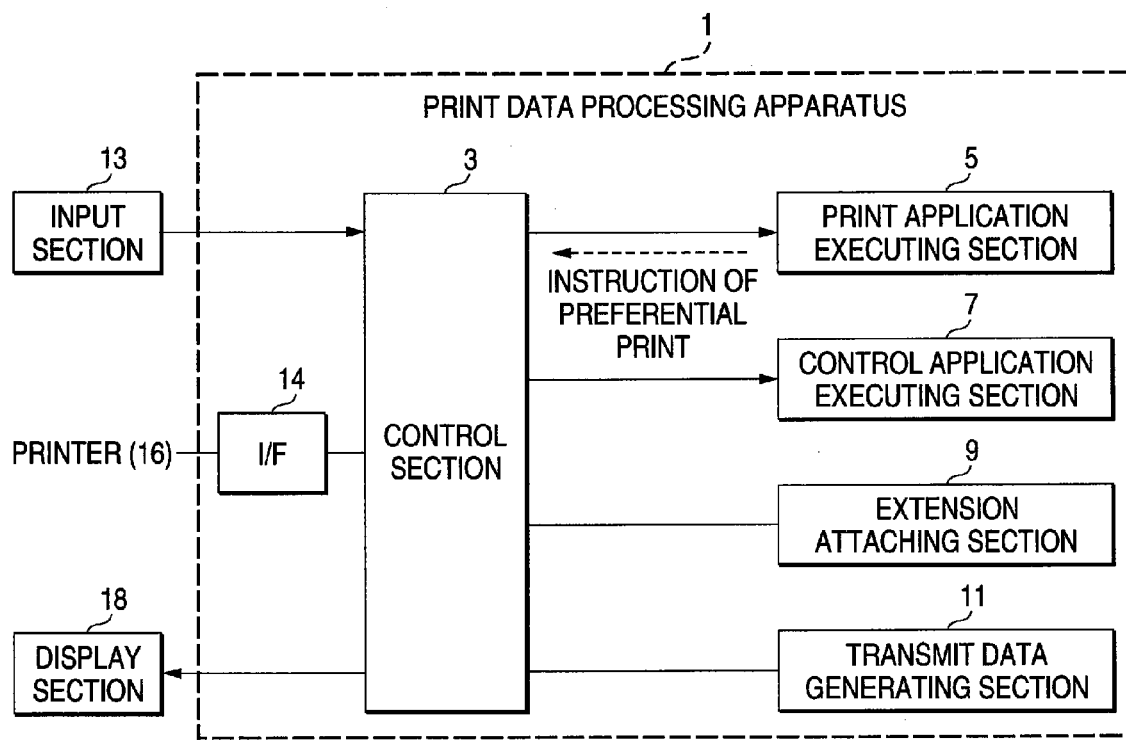
FIG. 9 is a block diagram showing the structure of a print data processing apparatus.

In the print data processing apparatus 1 of the second example, as shown in FIG. 9, when a print application executing section 5 generates print data, the print application executing section can output an instruction of a preferential print to a control section 3. When the instruction of the preferential print is outputted, an extension attaching section 9 attaches an extension of the preferential print (a second extension) to the print data. Specifically, the extension attaching section attaches the extension of doc to the print data. When the print application executing section does not output the instruction of the referential print, the extension attaching section 9 adds xls, pdf or ppc as a first extension to the print data (see FIG. 10).

The print application executing section 5 may output the instruction of the preferential print, for instance, under a condition that a user performs a prescribed input to the print data processing apparatus or the print data is formed by a specific application.

Figure 11:
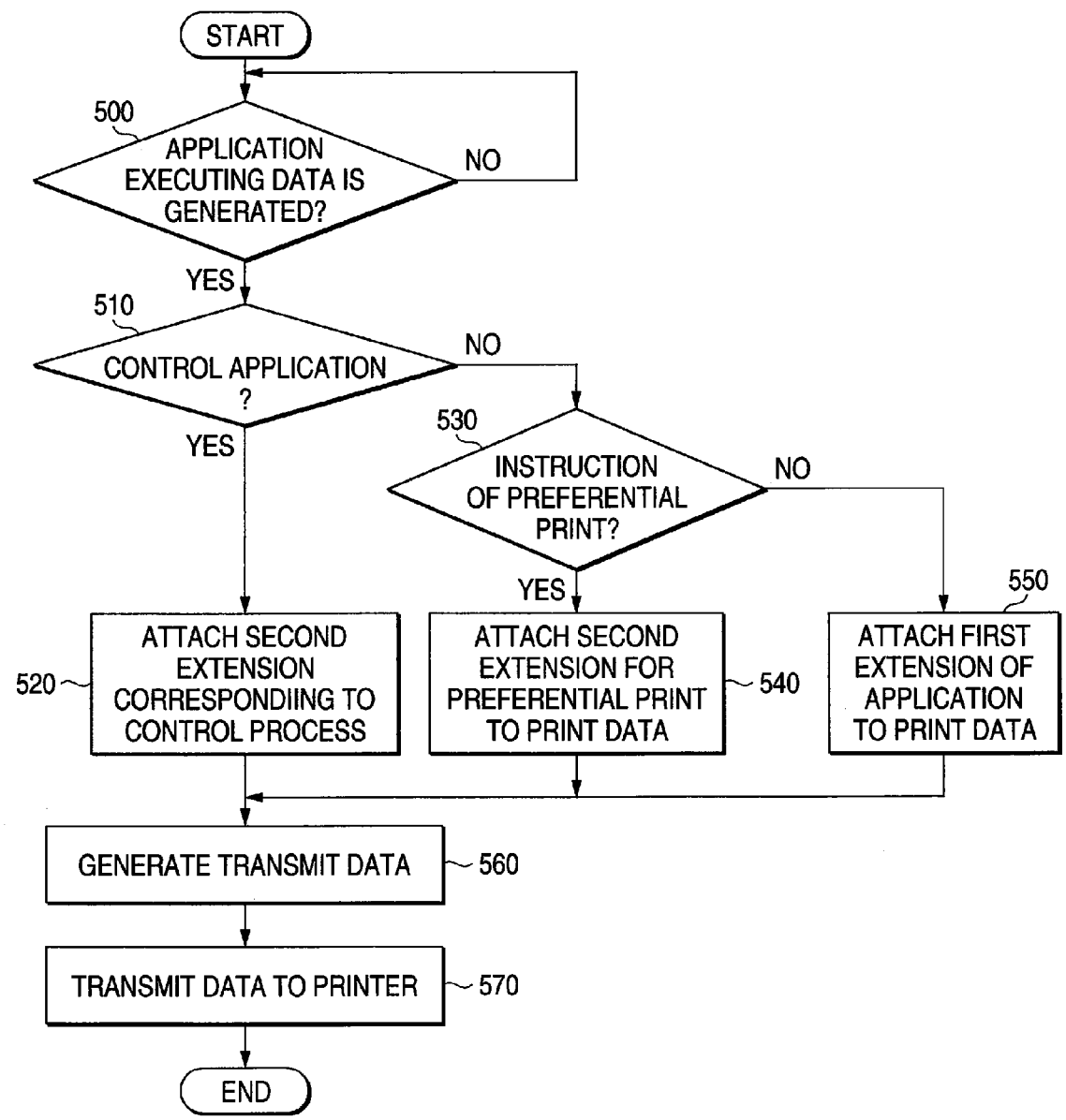
FIG. 11 is a flowchart showing processes performed by the print data processing apparatus.

Processes performed by the control section 3 of the print data processing apparatus 1 will be described by using a flowchart shown in FIG. 11.

In step 500, the control section decides whether or not a control application executing section 5 or the print application executing section 7 generates the data. In the case of YES, the control section advances to step 510. In the case of NO, the control section remains in the step 500.

In step 510, the control section decides whether or not the data generated in the step 500 is control process request data generated in the control application executing section 7. In the case of YES, the control section advances to step 520. In the case of NO, the control section advances to step 530.

In the step 520, the control section controls the extension attaching section 9 to attach the second extension corresponding to a control process to the control process request data.

Specifically, the control section controls the extension attaching section 9 to attach the second extension corresponding to the control process performed by the printer 16 to the control process request data in accordance with the table shown in FIG. 3.

On the other hand, in the step 530, the control section decide whether or not the instruction of the preferential print is received from the print application executing section 5. In the case of YES, the control section advances to step 540. In the case of NO, the control section advances to step 550.

In the step 540, the control section controls the extension attaching section 9 to attach doc as the second extension for the preferential print of the extensions (doc, xls, pdf, ppc) for the print data to the data (print data).

On the other hand, in the step 550, the control section controls the extension attaching section 9 to attach the first extension (for instance, xls, pdf, ppc in FIG. 10) corresponding to the kind of a formed application to the print data.

In step 560, the control section controls a transmit data generating section 11 to generate the control process request data to which the second extension is added in the step 520, the print data to which the second extension for the preferential print is added in the step 540 or the print data to which the first extension is added in the step 550 as transmit data to be transmitted to the printer.

Instep 570, the control section controls an interface 14 to transmit the transmit data generated in the step 560 to the printer 16.

Figure 12:
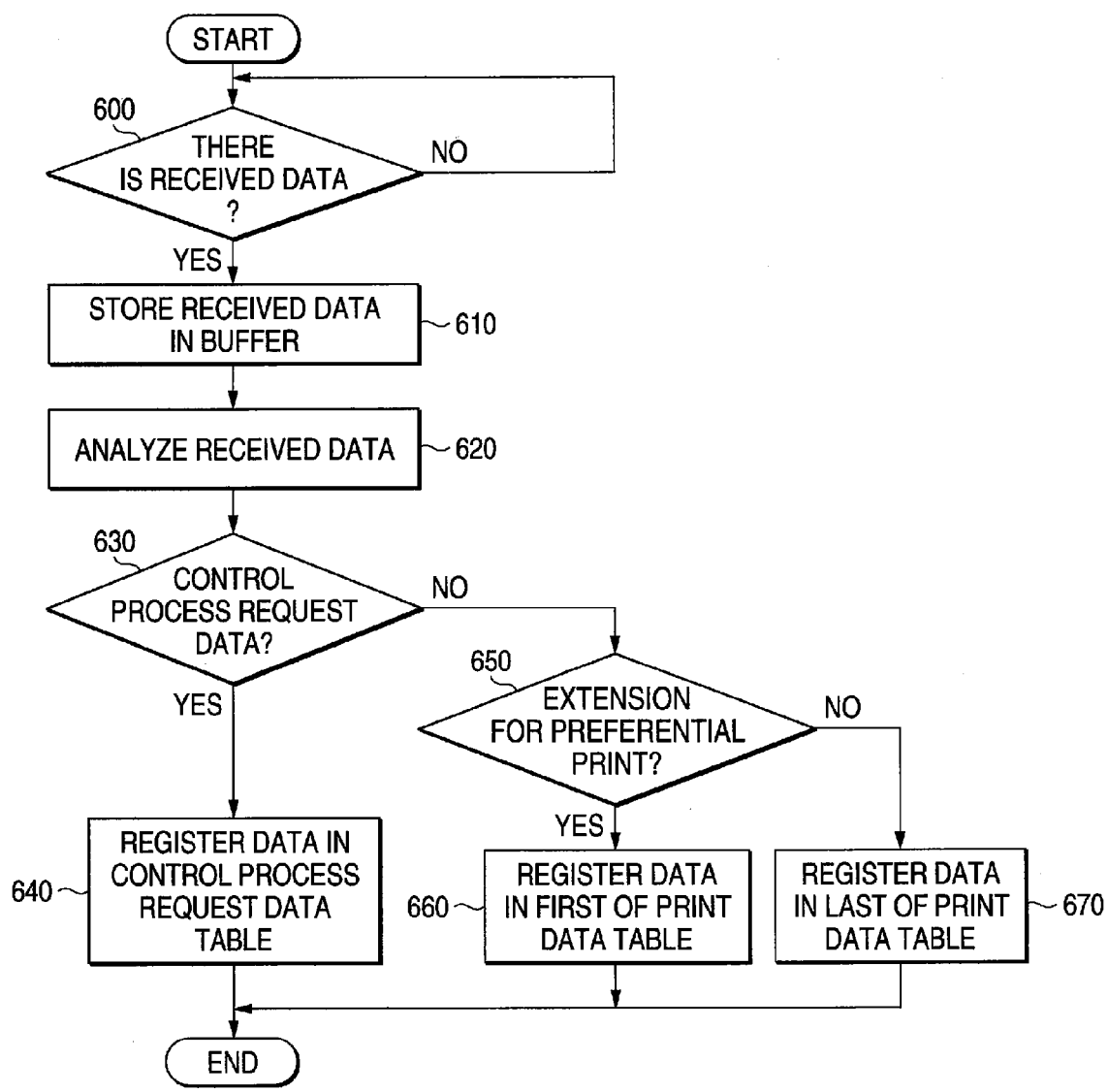
FIG. 12 is a flowchart showing processes performed by a printer.

Further, the printer 16 of the second example can set a sequence of a print process in accordance with the extension attached to the print data. Processes performed by an user interface 15 of the printer 16 will be described by using a flowchart shown in FIG. 12 and an explanatory view shown in FIGS. 13A and 13B.

In step 600, the user interface decides whether or not there is received data (print data and/or control process request data. In the case of YES, the user interface advances to step 610. In the case of NO, the user interface temporarily finishes processes.

In the step 610, the user interface stores the received data in a buffer 17.

Instep 620, the user interface analyzes the extension of the received data.

In step 630, the user interface decides whether or not the analyzed extension requests for the control process of the printer 16 (that is, whether or not the received data is the control process request data). In the case of YES, the user interface advances to step 640. In the case of NO (that is, when the received data is the print data), the user interface advances to step 650.

In the step 640, the user interface registers a part (address) including the extension of the control process request data in a control process request data table 21 and returns to a main routine (not shown in the drawing).

In the step 650, the user interface decides whether or not the extension of the print data is an extension for the preferential print. In the case of YES, the user interface advances to step 660. In the case of NO, the user interface advances to step 670.

In the step 660, the user interface registers the part (address) including the extension of the print data in the first part (top) of a print data table 19. For instance, as shown in FIG. 13A, even when the addresses of the print data P1 and P2 including xls and pdf as the extensions of an ordinary print are already registered in the print data table 19, the user interface registers the address of the print data P3 having doc as the extension for the preferential print in the top.

Figure 13A:
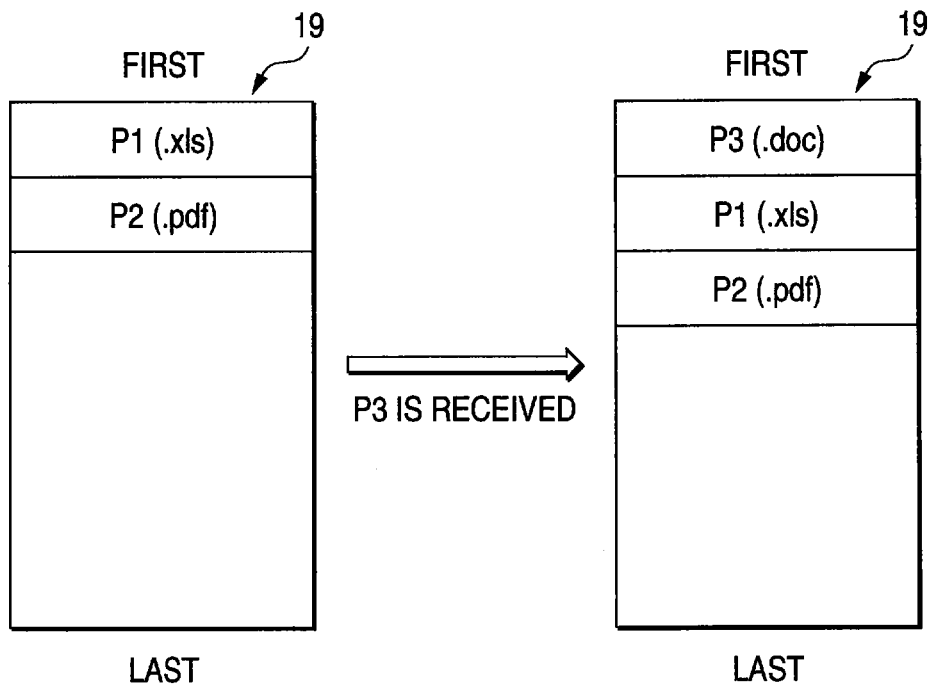
FIGS. 13A and 13B are explanatory views showing the corresponding relation between the priority of extensions and a sequence for registering addresses.

As described in the first example, since the print process is carried out in order from the print data corresponding to the address registered in the top of the print data table 19, in the case shown in FIG. 13A, the print process is carried out in order of P3, P1 and P2. After the step 660 is finished, the user interface returns to the main routine (not illustrated).

When the address including the extension for the preferential print is already registered, if another address including the extension for the preferential print is further registered, the latter is registered subsequently to the address including the extension for the preferential print that is previously registered.

Figure 13B:
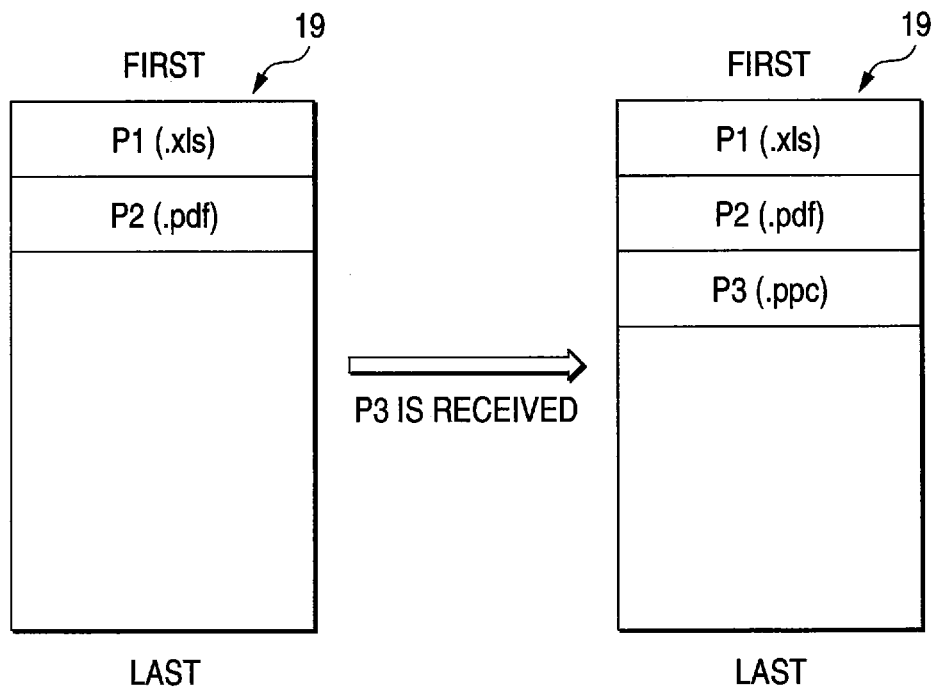

On the other hand, in the step 670, the user interface registers the address of the print data to be newly registered in the last of the print data table 19. For instance, as shown in FIG. 13B, when the addresses of the print data P1 and P2 including xls and pdf as the extensions of the ordinary print are already registered, if the address of the print data P3 including ppc as the extension of the ordinary print is registered, the address of P3 is located in the last of the sequence. Accordingly, in the case shown in FIG. 13B, the print process is carried out in order of P1, P2 and P3. After the step 670 is finished, the user interface returns to the main routine (not shown in the drawing).

As described above, in the print data processing apparatus 1 of the second example, when the print application executing section 5 generates the print data P3 including the instruction of the preferential print, the control unit 3 decides that the print application executing section 5 as a setting unit sets the control process of the preferential print, and controls the extension attaching unit 9 to attach the second extension of the preferential print to the print data. Further, when the printer 16 of the second example receives the print data P3 to which the second extension of the preferential print is attached, the printer performs the control process that the print process of the print data P3 is carried out preferentially to the print data P1 and P2 that is received before the print data P3.

Consequently, in the print data processing apparatus 1 and the printer 16 of the second example, the priority of the print process in the printer 16 can be effectively set in accordance with the designation of priority in the print data processing apparatus 1.

Further, in the second example, since the priority of the print process is set by the extension of the print data transmitted by the port for the print data, an effect is achieved that the port for transmitting data on the priority of the print process does not need to be separately provided.

It is to be understood that the present invention is not limited to the above-described examples and may be embodied in various forms within a scope without departing the spirit of the present invention.

For instance, in the first and second examples, the print data table 19 and the control process request data table 21 may not be separately provided, and the address of the print data and the address of the control process request data may be registered in one data table.

Further, the print data table 19 and the control process request data table 21 may not be provided and the print processing section 23 may read the extensions of the print data and the control process request data stored in the buffer 17.

Further, in the second example, to the extensions of the print data, not only the two stages of ordinary/preference, but also the priority divided into three stages or more may be attached.

What is claimed is:

1. A print data processing apparatus that controls, via hardware implementation, data transmitted to and received from a printer, comprising:
    an extension attaching unit that selectively attaches one of a first extension to print data and a second extension to control process request data that requests the printer to perform a control process that is different from a print process and corresponds to a kind of the second extension, prior to sending the one of the print data with the first extension and the control process request data with the second extension to the printer; and a transmission performing unit that transmits the print data or the control process request data to the printer, wherein the print data is data associated with a particular print job to be outputted by the printer, wherein the control process request data is data unrelated to any particular print job, that is not to be printed or processed for printing, and is configured to cause the printer to perform a control process other than print output or image processing, wherein the control process includes plural kinds of control processes, and wherein the second extension includes a plurality of second extensions, each of which corresponds to a respective one of the plural kinds of control processes.

2. The print data processing apparatus according to claim 1, further comprising:

a setting unit that sets the control process; and a deciding unit that decides whether or not the control process is set by the setting unit, wherein when the deciding unit decides that the control process is set, the extension attaching unit attaches the second extension corresponding to the control process set by the setting unit to the data.

3. The print data processing apparatus according to claim 1, wherein the plural kinds of control processes performed by the printer includes any of a transmission of a status of the printer, a setting of a print format, a setting of a medium used for a printing operation, and a setting of a priority of the printing operation.

4. The print data processing apparatus according to claim 1, further comprising:

a print application executing section that executes a print application to form the print data; and a control application execution section that forms the control process request data.

5. The print data processing apparatus according to claim 4, wherein the first extension is attached corresponding to a kind of the print application, and wherein the second extension is attached corresponding to a kind of the control process.

6. The print data processing apparatus according to claim 1, wherein the print data is data that is transmitted to the printer to be printed, and the control process request data is data that controls the printer to perform a function other than printing data.

7. The print data processing apparatus according to claim 1, wherein the print data and the control process request data are separate sets of data.

8. The print data processing apparatus according to claim 1, wherein the extension attaching unit determines a type of data, and when the extension attaching unit determines that the type of data is print data, the extension attaching unit attaches the first extension to the print data, and when the extension attaching unit determines that the type of data is control process request data, the extension attaching unit attaches the second extension to the control process request data.

9. A printer comprising:

a receiving unit that receives data transmitted from a print controlling apparatus; and a control processing unit that reads an extension of data having the extension of the received data upon receipt of the data from the print controlling apparatus, and when the read extension is a first extension, prints print data to which the first extension is attached, and when the read extension is a second extension, performs a control process, which is different from a print process, corresponding to a kind of the second extension, and attached to control process request data, wherein the print data is data associated with a particular print job to be outputted by the printer, wherein the control process request data is data unrelated to any particular print job, that is not to be printed or processed for printing, and is configured to cause the printer to perform a control process other than print output or image processing, wherein the control process includes plural kinds of control processes, and wherein the second extension includes a plurality of second extensions, each of which corresponds to a respective one of the plural kinds of control processes.

10. The printer according to claim 9, wherein the control processing unit includes:

an extension deciding unit that decides whether or not the extension of the data is the second extension; and a control process executing unit that performs the control process corresponding to the second extension when the extension deciding unit decides that the extension is the second extension.

11. The printer according to claim 10, further comprising:

an extension storing unit that takes out and stores a part including the extension from the received data having the extension, wherein the extension deciding unit reads the extension from the extension storing unit and makes decision.

12. The printer according to claim 11, wherein the data having the extension includes print data having the first extension and control process request data having the second extension that requests for the control process of the printer, and the extension storing unit includes an extension storing unit A that stores the first extension of the print data and an extension storing unit B that stores the second extension of the control process request data.

13. The printer according to claim 10, wherein the control process executing unit includes a corresponding table of the second extension and the control process to-be performed, and determines the control process to be performed in accordance with the corresponding table.

14. The printer according to claim 13, wherein the control process corresponding to the second extension includes a process that transmits the corresponding table to the print controlling apparatus.

15. The printer according to claim 13, wherein the control process corresponding to the second extension includes a process that overwrites the corresponding table received from the print controlling apparatus on an existing corresponding table.

16. The printer according to claim 9, wherein the plural kinds of control processes corresponding to the second extension includes any of a transmission of a status of the printer, a setting of a print format, a setting of a medium used for a printing operation, and a setting of a priority of the printing operation.

17. The printer according to claim 9, wherein the print data is data that is transmitted to the printer to be printed, and the control process request data is data that controls the printer to perform a function other than printing data.

18. The printer according to claim 9, wherein the print data and the control process request data are separate sets of data.

19. The printer according to claim 9, wherein the control processing unit determines whether the received data is print data or control process request data, based on the read extension.

20. A print system comprising:
a print data processing apparatus that controls data transmitted to and received from a printer,
the print data processing apparatus comprising:
an extension attaching unit that selectively attaches one of a first extension to print data and a second extension to control process request data that requests the printer to perform a control process that is different from a print process; and
a transmission performing unit that transmits one of the print data with the first extension and the control process request data with the second extension to the printer; and
the printer comprising:
a receiving unit that receives data transmitted from the print controlling apparatus; and
a control processing unit that reads an extension of data having the extension of the received data, and
when the read extension is the first extension, prints the print data to which the first extension is attached, and
when the read extension is the second extension, performs the control process, which is different from the print process, corresponding to a kind of the second extension,
wherein the print data is data associated with a particular print job to be outputted by the printer,
wherein the control process request data is data unrelated to any particular print job, that is not to be printed or processed for printing, and is configured to cause the printer to perform a control process other than print output or image processing,
wherein the control process includes plural kinds of control processes, and
wherein the second extension includes a plurality of second extensions, each of which corresponds to a respective one of the plural kinds of control processes.

* * * * *